United States Patent
Canton

(10) Patent No.: US 10,025,621 B2
(45) Date of Patent: Jul. 17, 2018

(54) METHOD AND SYSTEM FOR TRANSITION FROM DIRECT INTERRUPT STATE TO VIRTUAL INTERRUPT STATE OF EMULATED COMPUTING ENVIRONMENTS

(71) Applicant: Wind River Systems, Inc., Alameda, CA (US)

(72) Inventor: Dino Canton, Alameda, CA (US)

(73) Assignee: WIND RIVER SYSTEMS, INC, Alameda, CA (US)

( * ) Notice: Subject to any disclaimer, the term of this patent is extended or adjusted under 35 U.S.C. 154(b) by 238 days.

(21) Appl. No.: 14/630,202

(22) Filed: Feb. 24, 2015

(65) Prior Publication Data

US 2016/0246644 A1    Aug. 25, 2016

(51) Int. Cl.
*G06F 9/48* (2006.01)
*G06F 9/455* (2006.01)
*G06F 13/24* (2006.01)

(52) U.S. Cl.
CPC ........ *G06F 9/4812* (2013.01); *G06F 9/45558* (2013.01); *G06F 13/24* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 8,423,799 B2 * | 4/2013 | Krishnamurthy | G06F 1/3203 713/300 |
| 2013/0174148 A1 * | 7/2013 | Amit | G06F 9/45558 718/1 |
| 2016/0077848 A1 * | 3/2016 | Tu | G06F 9/45558 718/1 |

* cited by examiner

*Primary Examiner* — Farley Abad
*Assistant Examiner* — Dayton Lewis-Taylor
(74) *Attorney, Agent, or Firm* — Fay Kaplun & Marcin, LLP

(57) ABSTRACT

A system and method for configuring a virtual computing environment to operate in direct interrupt mode; receiving a triggering event triggering a transition from direct interrupt mode to virtual interrupt mode; copying contents of a physical interrupt queue into a virtual interrupt queue; acknowledging vectors present in the physical interrupt queue; and transitioning the virtual computing environment to virtual interrupt mode. The system includes a processor for performing the steps of the method.

16 Claims, 6 Drawing Sheets

Pre-Transition
Physical Queue
410
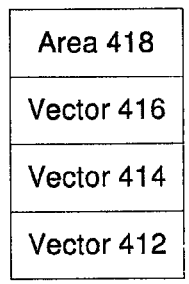
Pre-Transition
Emulated Queue
420
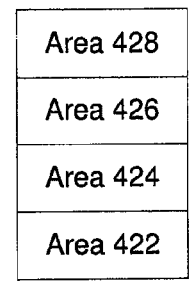
Post-Transition
Physical Queue
430
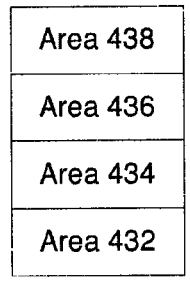
Post-Transition
Emulated Queue
440
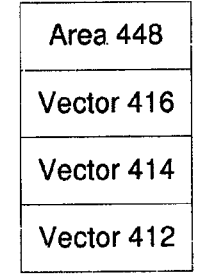
Figure 4

US 10,025,621 B2

METHOD AND SYSTEM FOR TRANSITION FROM DIRECT INTERRUPT STATE TO VIRTUAL INTERRUPT STATE OF EMULATED COMPUTING ENVIRONMENTS

BACKGROUND

Emulated computing environments can be configured in virtual interrupt mode or in direct interrupt mode. In virtual interrupt mode, interrupts are delivered by a hypervisor, resulting in a performance penalty. In direct interrupt mode, the emulated computing environment has direct access to hardware and interrupts can be delivered without intervention by the hypervisor, but in some cases it may be undesirable to give an emulated computing environment direct hardware access. Therefore, transitions between direct interrupt mode and virtual interrupt mode are occasionally required.

SUMMARY OF THE INVENTION

A method, comprising: configuring a virtual computing environment to operate in direct interrupt mode; receiving a triggering event triggering a transition from direct interrupt mode to virtual interrupt mode; copying contents of a physical interrupt queue into a virtual interrupt queue; acknowledging vectors present in the physical interrupt queue; and transitioning the virtual computing environment to virtual interrupt mode.

A system, comprising: a memory storing a set of instructions; and a processor executing the set of instructions to perform operations comprising: instantiating a hypervisor; instantiating, using the hypervisor, a virtual computing environment; configuring the virtual computing environment to operate in direct interrupt mode; receiving a triggering event triggering a transition from direct interrupt mode to virtual interrupt mode; copying contents of a physical interrupt queue into a virtual interrupt queue; acknowledging vectors present in the physical interrupt queue; and transitioning the virtual computing environment to virtual interrupt mode.

A non-transitory computer-readable storage medium storing a set of instructions that are executable by a processor, the instructions, when executed by the processor, causing the processor to perform operations comprising: configuring a virtual computing environment to operate in direct interrupt mode; receiving a triggering event triggering a transition from direct interrupt mode to virtual interrupt mode; copying contents of a physical interrupt queue into a virtual interrupt queue; acknowledging vectors present in the physical interrupt queue; and transitioning the virtual computing environment to virtual interrupt mode.

BRIEF DESCRIPTION OF THE DRAWINGS

FIG. 4 shows a propagation of contents of an interrupt queue during a transition from direct interrupt mode to virtual interrupt mode.

DETAILED DESCRIPTION

Figure 1:
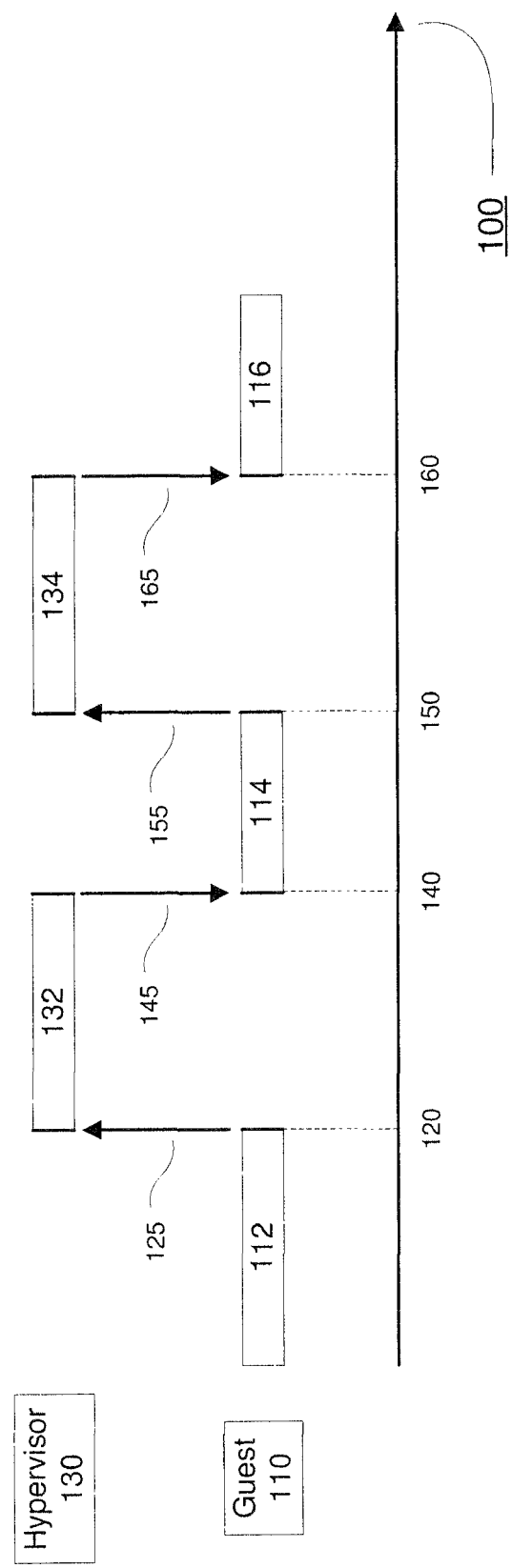
FIG. 1 shows a flow of operations in a virtual computing environment using virtual interrupt mode.

The exemplary embodiments may be further understood with reference to the following description and the related appended drawings, wherein like elements are provided with the same reference numerals. Specifically, the exemplary embodiments relate to methods and systems for transitioning a virtualized computing environment emulated by a hypervisor from direct interrupt mode, in which interrupts are delivered directly to the virtualized computing environment, to virtual interrupt mode, in which interrupts are delivered via the hypervisor.

A hypervisor is an operating system that manages different virtual machines running within a computing environment. A virtual machine is a construct of software and hardware that runs software as if it were running natively on hardware that is being virtualized by the virtual machine. A virtual machine may run any desired operating system, such as Windows, Linux, etc. The hypervisor schedules the operations of different guest virtual machines. An operating system running within a virtual machine and scheduled by a hypervisor operates as if it is running natively on hardware emulated by the virtual machine.

Figure 2:
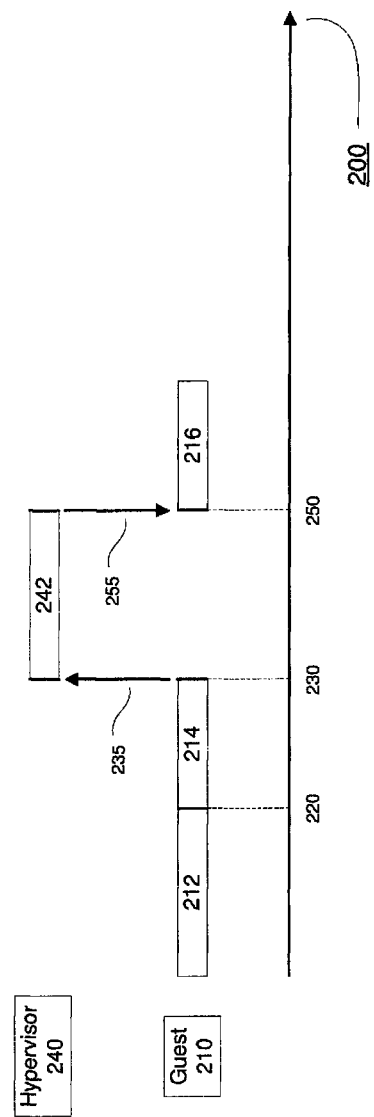
FIG. 2 shows a flow of operations in a virtual computing environment using direct injection of interrupts.
Figure 3:
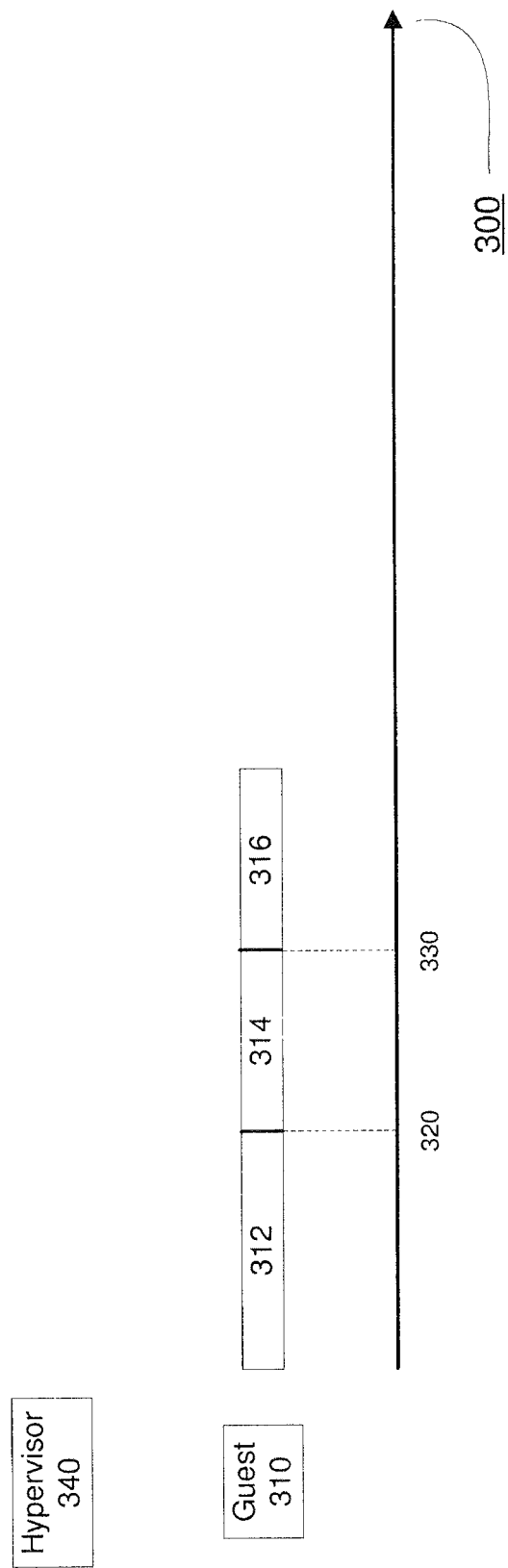
FIG. 3 shows a flow of operations in a virtual computing environment using direct injection and acknowledgement of interrupts.

In a typical virtual machine environment, external interrupts are handled by the hypervisor. Thus, when a guest virtual machine is running and an interrupt is received, the virtual machine exits, the hypervisor handles the interrupt and injects a virtual interrupt into the virtual machine, and the guest continues running. FIG. 1 illustrates the flow of operations in a computing environment in which interrupts are handled by the hypervisor. Along time axis 100, guest 110 executes for a period of time 112. A hardware interrupt is received at point 120 and virtual machine exit 125 occurs. Hypervisor 130 receives and processes the interrupt during period of time 132. At point 140, hypervisor 130 injects a virtual interrupt into the environment of guest 110 and virtual machine enter 145 occurs. During period of time 114, the guest 110 acts on the virtual interrupt, and, at point 150, acknowledges completion of the virtual interrupt. This acknowledgement triggers a second virtual machine exit 155. During period of time 134, the hypervisor 130 processes the results of the virtual interrupt and sends any appropriate acknowledgement to the external entity from which the interrupt was received. At point 160, a second virtual machine enter 165 occurs, and the guest 110 can then continue its execution during period of time 116. It will be apparent to those of skill in the art that the need for two VM exit/VM enter pairs in order to accomplish the execution of a single interrupt results in significant latency in delivery of the interrupt and correspondingly decreased overall throughput. Additionally, it will be apparent to those of skill in the art that the size of time blocks 112, 114, 116, 132 and 134 shown in FIG. 1, as well as the time blocks which will be shown in FIGS. 2 and 3, are only illustrative and not intended to characterize the actual amounts time required for various tasks in a real-world implementation.

In some embodiments of a hypervisor, direct interrupt delivery is supported. In such embodiments, interrupts may be delivered directly to a guest without the overhead of one of the VM exit/VM enter pairs described above with reference to FIG. 1. FIG. 2 illustrates the flow of operations for an interrupt in an environment supporting direct interrupt delivery. Along time axis 200, guest 210 executes for a period of time 212. A hardware interrupt is received at point 220 and delivered directly to guest 210. This may be accomplished by allowing the guest 210 to have direct access to hardware associated with the received interrupt. After receipt of the interrupt at point 220, the guest 210 acts on the interrupt during period of time 214 and, at point 230, acknowledges completion of the interrupt. This acknowledgement triggers a virtual machine exit 235. Hypervisor 240 receives the acknowledgement and, during period of time 242, processes the results of the interrupt and sends any appropriate acknowledgement to the external entity from which the interrupt was received. At point 250, a virtual machine enter 255 occurs, and the guest 210 can then continue its execution during period of time 216. It will be apparent to those of skill in the art that the need for one VM exit/VM enter pairs in order to accomplish the execution of an interrupt results in improved throughput as compared to virtual interrupts described above with reference to FIG. 1, but still results in greater latency than if the guest 210 were running natively on hardware.

In further embodiments of a hypervisor, direct interrupt delivery and direct interrupt acknowledgement are both supported. This may be accomplished by directly mapping part of the register set of an interrupt controller, such as an x2APIC register set, into virtual memory of a guest, allowing the guest to have to have increased levels of access to hardware associated with the received interrupt than those required for direct interrupt delivery as described above with reference to FIG. 2. In such embodiments, interrupts may be delivered directly to a guest and acknowledged by the guest without the overhead of either of the VM exit/VM enter pairs described above with reference to FIG. 1. FIG. 3 illustrates the flow of operations for an interrupt in an environment supporting direct interrupt delivery and acknowledgement. Along time axis 300, guest 310 executes for a period of time 312. A hardware interrupt is received at point 320 and delivered directly to guest 310. After receipt of the interrupt at point 320, the guest 310 acts on the interrupt during period of time 314 and, at point 330, sends any appropriate acknowledgement directly to the external entity from which the interrupt was received. The guest 310 can then continue its execution during period of time 316. Hypervisor 340 does not need to be involved in the processing of such an interrupt. It will be apparent to those of skill in the art that throughput may be maximized by obviating the need for any VM exit/VM enter pairs.

However, hypervisors supporting direct interrupt delivery according to the above description only support a small number of direct interrupts. Additionally, it may be desirable not to give a guest operating system constant direct access to hardware, such as for security concerns or where another operating system requires access to the same hardware. Therefore, because virtual interrupt mode and direct interrupt mode each have advantages and disadvantages, as described above, it is desirable to periodically switch between the two modes. In this case, a guest will alternate between interacting with hardware directly and interacting with emulated hardware; the guest itself will see the same hardware in either case.

A transition from virtual interrupt mode (in which interrupts are provided to a guest by a hypervisor, requiring multiple VM exits and enters, as described above with reference to FIG. 1) to direct interrupt mode (in which a guest has direct access to hardware and interrupts are provided to the guest without added latency, as described above with reference to FIG. 3) may be accomplished using known techniques, such as by capturing a vector queue state of physical hardware (for example, of an APIC queue) and using the captured vector queue state to generate a virtual vector queue state for emulated hardware. A transition from virtual interrupt mode to direct interrupt mode is illustrated in FIG. 4. The contents of physical APIC vector are propagated into an emulated APIC vector queue. Prior to propagation, pre-transition physical queue 410 includes a plurality of vectors 412, 414 and 416 ranked in priority from highest (vector 416) to lowest (vector 412), as well as unused area 418. Pre-transition emulated queue 420 includes unused areas 422, 424, 426 and 428, also ranked in priority from highest (area 428) to lowest (area 422). When transition from virtual mode to direct mode occurs, vectors 412, 414 and 416 are moved from the physical queue to the emulated queue, resulting in post-transition emulated queue 440 including vectors 412, 414 and 416, with priority retained, as well as unused area 448. Post-transition physical queue, which remains active for a hypervisor, includes unused areas 432, 434, 436 and 438.

However, existing techniques for transitioning from direct interrupt mode to virtual interrupt mode may be deficient because it may be difficult to accomplish such a transition with a large number of interrupts already present in the physical queue. Such a transition may be triggered for a variety of reasons, including a context switch, a reset of a virtual core, or the delivery of a non-direct mapped vector owned by a hypervisor. The exemplary embodiments provide techniques for transitioning from direct interrupt mode to virtual interrupt mode.

Figure 5:
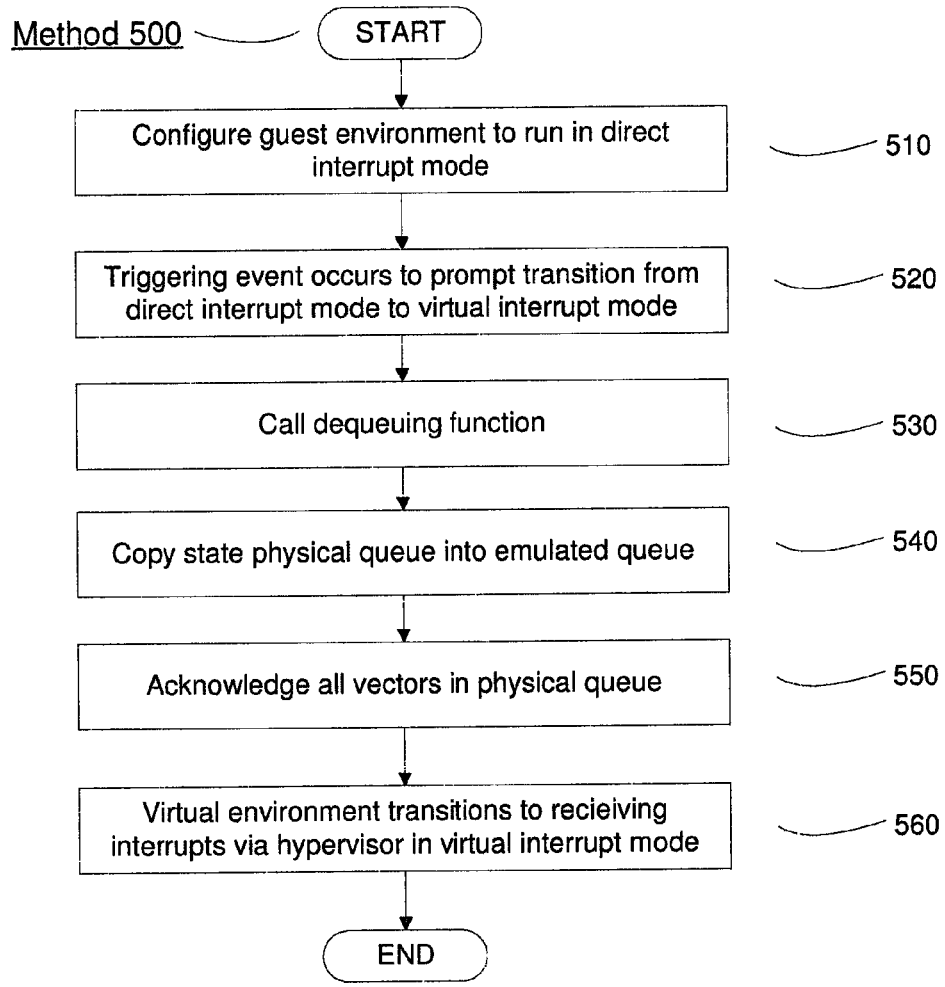
FIG. 5 shows an exemplary method for transitioning from direct interrupt mode to virtual interrupt mode.

FIG. 5 illustrates an exemplary method 500 for transitioning a guest environment from direct interrupt mode to virtual interrupt mode. In step 510, a virtual environment is initialized by a hypervisor and configured to operate in direct interrupt mode. This may be accomplished as described above or using any other appropriate technique. The virtual environment may also be appropriately configured to perform the subsequent steps of method 500, which will be described hereinafter. After the virtual environment has been configured in direct interrupt mode in step 510, the guest operating system of the virtual environment may function with minimal latency, as described above with reference to FIG. 3.

In step 520, a triggering event occurs to initiate a transition from direct interrupt mode to virtual interrupt mode. As described, this event may be a context switch, a reset of a virtual core, or the delivery of a non-direct mapped vector owned by a hypervisor. The following steps of the method 500 may be performed using an exception handler in user mode in the context of a currently running task, within the context of the guest environment. Thus, the hypervisor may be programmed and preconfigured with code operable to accomplish these steps.

In step 530, a dequeueing function, which may be called vmDirectDequeuePhysicalApic( ) is called. The following annotated code snippet may implement the dequeueing function:

```
/* calling exception handler directly from task mode */
/* set flag to prevent rescheduling in the exception handler */
    excLevel++;
    excHandler (vector);
    excLevel--;
/* determine whether the interrupt results in a reschedule event? */
    if (rescheduleNeeded)
    {
        /* give up control of the CPU,
        * return to virtual mode
        */
```

-continued

```
vmDirectDequeuePhysicalApic( );
/* reschedule */
schedulerRun( );
}
```

In step 540, the state of the physical APIC queue is copied to the emulated queue. This step may be performed at the task level without invoking a hypervisor interrupt handler. In step 550, all outstanding vectors in the physical APIC queue are acknowledged. In step 560, the hypervisor and virtual environment transition to virtual mode. All subsequent interrupts are delivered to the virtual environment via the hypervisor, as described above with reference to FIG. 1. Following step 560, the method 500 terminates. It will be apparent to those of skill in the art that the virtual environment may subsequently transition back to direct mode, as described above, in order to regain the performance advantages of direct mode. The method 500 may then be repeated when a transition back to virtual mode is appropriate.

Figure 6:
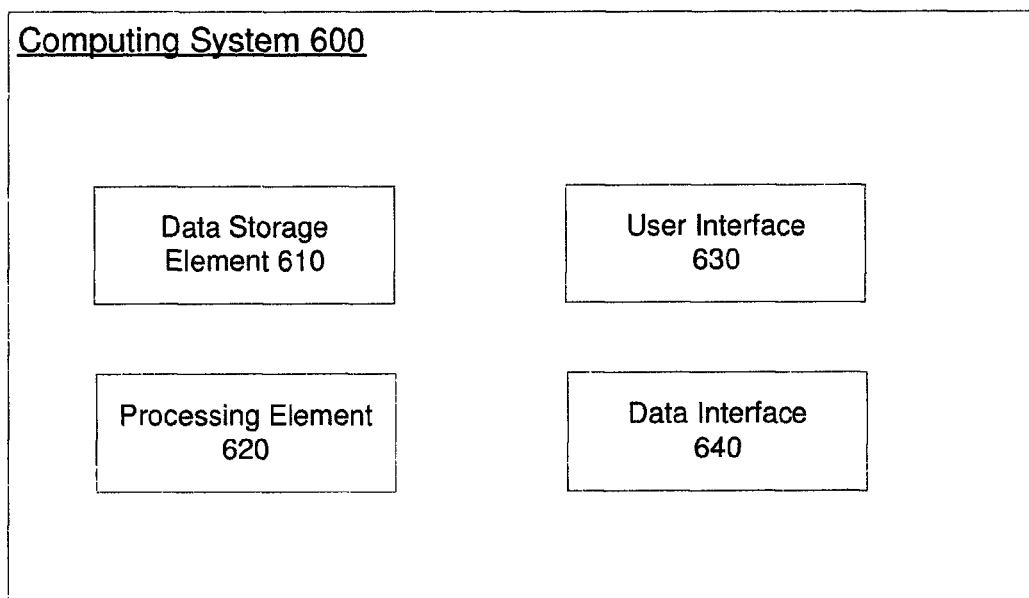
FIG. 6 shows an exemplary system in which the exemplary method of FIG. 5 may be implemented.

FIG. 6 illustrates an exemplary computing system 600 that may implement the exemplary embodiments described above with reference to method 500. The computing system 600 includes a data storage element 610 (e.g., one or more hard drives, solid state drives, or other persistent data storage components). The data storage element 610 may store code for implementing the method 500. The computing system 600 also includes a processing element 620, which may include one or more microprocessors capable of executing code such as the code for implementing the method 500. The computing system 600 also includes a user interface 630, which may comprise one or more physical components (e.g., a keyboard, mouse, touchpad, display, touchscreen, etc.) operable to receive user inputs and provide results (e.g., the display 400) to a user. The computing system 600 also includes a data interface 640 (e.g., a wired or wireless connection to a network and/or to the Internet) providing for communications with external data sources. It will be apparent to those of skill in the art that there may be any number of possible implementations of a computing system 600, that such implementations may include additional elements not specifically described above, and that the computing system 600 may be capable of performing additional tasks beyond those described above with reference to the exemplary embodiments.

The exemplary embodiments described above may enable a virtual environment to transition from direct interrupt mode to indirect interrupt mode. This transition may be accomplished gracefully and while a plurality of interrupts are in the process of being serviced by guest software running in the virtual environment. Those of skill in the art will understand that the above-described exemplary embodiments may be implemented in any number of matters, including as a software module, as a combination of hardware and software, etc. For example, the exemplary method 500 may be embodied in a program stored in a non-transitory storage medium and containing lines of code that; when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
configuring a virtual computing environment to operate in direct interrupt mode;
receiving a triggering event triggering a transition from direct interrupt mode to virtual interrupt mode;
copying contents of a physical interrupt queue into a virtual interrupt queue;
acknowledging vectors present in the physical interrupt queue;
transitioning the virtual computing environment to virtual interrupt mode; and
calling a dequeueing function, wherein the dequeueing function is run in user mode in a context of a current task.

2. The method of claim 1, wherein the triggering event comprises one of a context switch, a reset of the virtual computing environment, and a receipt of a non-direct mapped vector.

3. The method of claim 1, wherein, when the virtual computing environment operates in direct interrupt mode, the virtual computing environment has direct access to hardware.

4. The method of claim 3, wherein, when the virtual computing environment operates in direct interrupt mode, interrupts from the hardware are delivered to the virtual computing environment without participation of a hypervisor.

5. The method of claim 1, wherein, when the virtual computing environment operates in virtual interrupt mode, a hypervisor delivers interrupts to the virtual computing environment.

6. The method of claim 1, wherein the dequeueing function sets a flag to prevent rescheduling in an exception handler.

7. The method of claim 1, wherein the virtual computing environment is virtualized by a hypervisor.

8. The method of claim 1, wherein the physical interrupt queue is a physical interrupt queue of an x2APIC.

9. A system, comprising:
a memory storing a set of instructions; and
a processor executing the set of instructions to perform operations comprising:
instantiating a hypervisor;
instantiating, using the hypervisor, a virtual computing environment;
configuring the virtual computing environment to operate in direct interrupt mode;
receiving a triggering event triggering a transition from direct interrupt mode to virtual interrupt mode;
copying contents of a physical interrupt queue into a virtual interrupt queue;
acknowledging vectors present in the physical interrupt queue;
transitioning the virtual computing environment to virtual interrupt mode; and
calling a dequeueing function, wherein the dequeueing function sets a flag to prevent rescheduling in an exception handler.

10. The system of claim 9, wherein the triggering event comprises one of a context switch, a reset of the virtual computing environment, and a receipt of a non-direct mapped vector.

11. The system of claim 9, wherein, when the virtual computing environment operates in direct interrupt mode, the virtual computing environment has direct access to hardware of the system.

12. The system of claim 11, wherein, when the virtual computing environment operates in direct interrupt mode, interrupts from the hardware are delivered to the virtual computing environment without participation of the hypervisor.

13. The system of claim 9, wherein, when the virtual computing environment operates in virtual interrupt mode, the hypervisor delivers interrupts to the virtual computing environment.

14. The system of claim 9, wherein the dequeueing function is run in user mode in a context of a current task.

15. The system of claim 9, wherein the physical interrupt queue is a physical interrupt queue of an x2APIC.

16. A non-transitory computer-readable storage medium storing a set of instructions that are executable by a processor, the instructions, when executed by the processor, causing the processor to perform operations comprising:
   configuring a virtual computing environment to operate in direct interrupt mode;
   receiving a triggering event triggering a transition from direct interrupt mode to virtual interrupt mode;
   copying contents of a physical interrupt queue into a virtual interrupt queue;
   acknowledging vectors present in the physical interrupt queue;
   transitioning the virtual computing environment to virtual interrupt model; and
   calling a dequeueing function, wherein the dequeueing function is run in user mode in a context of a current task.

* * * * *